(12) United States Patent
Kwon

(10) Patent No.: US 11,767,068 B2
(45) Date of Patent: Sep. 26, 2023

(54) AIR GUIDE APPARATUS FOR VEHICLE

(71) Applicants: HYUNDAI MOTOR COMPANY, Seoul (KR); KIA CORPORATION, Seoul (KR)

(72) Inventor: Hyung Il Kwon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 3 days.

(21) Appl. No.: 17/745,403

(22) Filed: May 16, 2022

(65) Prior Publication Data

US 2023/0075522 A1 Mar. 9, 2023

(30) Foreign Application Priority Data

Sep. 7, 2021 (KR) .................. 10-2021-0119158

(51) Int. Cl.
*B62D 35/00* (2006.01)
*B60K 11/08* (2006.01)
*B62D 35/02* (2006.01)

(52) U.S. Cl.
CPC .......... *B62D 35/02* (2013.01); *B60K 11/085* (2013.01); *B62D 35/005* (2013.01)

(58) Field of Classification Search
CPC .... B62D 35/00; B62D 35/001; B62D 35/005; B62D 35/008; B60T 5/00; B60K 11/08; B60K 11/085

USPC ............................................ 296/180.3, 180.5
See application file for complete search history.

(56) References Cited

U.S. PATENT DOCUMENTS

| 9,487,251 | B2* | 11/2016 | Gibson | F16D 65/847 |
| 10,518,827 | B2* | 12/2019 | Ibañez Moreira | B62D 35/00 |
| 2012/0071075 | A1* | 3/2012 | Wolf | B60T 5/00 454/162 |
| 2016/0016617 | A1* | 1/2016 | Wolf | B60K 11/04 296/208 |
| 2016/0176385 | A1* | 6/2016 | Wolf | F16D 65/847 296/208 |
| 2022/0289315 | A1* | 9/2022 | Harter | B62D 37/02 |

FOREIGN PATENT DOCUMENTS

| DE | 102020110342 A1 | * | 10/2020 |
| DE | 102020117405 A1 | * | 1/2022 |
| DE | 102020132902 B3 | * | 3/2022 |
| GB | 2601176 A | * | 5/2022 |

* cited by examiner

*Primary Examiner* — Jason S Daniels
(74) *Attorney, Agent, or Firm* — MCDONNELL BOEHNEN HULBERT & BERGHOFF LLP

(57) ABSTRACT

An air guide apparatus for a vehicle includes a front wheel housing at least partially surrounding a front wheel, and having an air outlet which is open to the front wheel, a first vane assembly including a plurality of first vanes which are tiltable in a position adjacent to the air outlet, and a first driving mechanism by which the plurality of first vanes are driven, and a second vane assembly including a plurality of second vanes which are tiltable in a position adjacent to the plurality of first vanes, and a second driving mechanism by which the plurality of second vanes are driven.

19 Claims, 14 Drawing Sheets

[Response surface of brake cooling air flow with respect to vane tilting angles]

[Optimal postions(Response surface of drag coefficient) with respect to vane tilting angles]

AIR GUIDE APPARATUS FOR VEHICLE

CROSS REFERENCE TO RELATED APPLICATIONS

This application is based on and claims the benefit of priority to Korean Patent Application No. 10-2021-0119158, filed on Sep. 7, 2021, in the Korean Intellectual Property Office, the disclosure of which is incorporated herein in its entirety by reference.

TECHNICAL FIELD

The present disclosure relates to an air guide apparatus for a vehicle, and more particularly, to an air guide apparatus for a vehicle capable of optimally improving automotive aerodynamics, cooling, and braking performance.

BACKGROUND

The development of automotive aerodynamics systemically reduces drag to improve fuel efficiency and acceleration performance, and properly controls lift forces and axle lift distributed to the drive wheels to achieve high-speed driving and cornering stability. In addition, by developing the performance of various individual systems related to airflow and properly integrating them into the overall system, the integrated performance of individual vehicles may be appropriately created and developed. The development of automotive aerodynamics is considered as a very important technical field in the automotive industry as it can have a wide-ranging impact on the vehicle's driving performance, comfort, safety, stability, cooling, and visibility.

The vehicle may have various aerodynamic apparatuses guiding the airflow in order to improve aerodynamic performance and cooling performance. For example, the aerodynamic apparatuses may include an active air flap system opening and closing the openings of a grille, and air guide apparatuses provided on both left and right sides of the vehicle.

The active air flap system may adjust the opening degree of the openings of the grille depending on a vehicle speed, an ambient air temperature, and the like, thereby controlling the flow rate of the ambient air flowing into a front compartment of the vehicle through the grille, and thus the active air flap system may be able to stably improve the conflicting cooling performance and aerodynamic performance.

Some vehicles may include a pair of side heat exchangers provided on both left and right sides of the vehicle, respectively. Each heat exchanger may be aligned with a left/right side surface of a front bumper or the front of a front wheel house (front wheel guard) along a longitudinal direction of the vehicle. The front wheel house surrounding each front wheel may have an air outlet permitting the exit of the air passing through the heat exchanger, and the air outlet may be fixedly provided on the front wheel house. Accordingly, the ambient air may be directed toward the front compartment of the vehicle through the front end of the vehicle, and the air flowing into the front compartment may pass through each side heat exchanger and then be directed toward a brake mechanism of the front wheel through the air outlet of each front wheel house.

In the vehicle having the side heat exchangers, the pair of air guide apparatuses may be provided on both left and right sides of the front of the vehicle to guide the air toward the front wheels, respectively. Even in the case of a general vehicle with a heat exchanger placed in the middle of the front compartment, the pair of air guide apparatuses may be provided to properly guide stagnant air flow inside an engine room and allow the air to exit.

However, the air guide apparatus according to the related art may be characterized by the fixed air outlet, and accordingly it may be difficult to flexibly respond to changes in the cooling performance of the heat exchanger, the cooling performance of the brake mechanism, and the aerodynamic performance of the vehicle while the vehicle is driving.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides an air guide apparatus for a vehicle capable of optimally improving the aerodynamic performance of the vehicle, the cooling performance of a heat exchanger, and the cooling performance of a brake mechanism by changing or adjusting the direction of air flow exiting from an air outlet provided in a surface of a front wheel house facing a front wheel according to various drive modes (driving conditions) of the vehicle.

According to an aspect of the present disclosure, an air guide apparatus for a vehicle may include a front wheel housing at least partially surrounding a front wheel, and having an air outlet which is open to the front wheel, a first vane assembly including a plurality of first vanes which are tiltable in a position adjacent to the air outlet, and a first driving mechanism by which the plurality of first vanes are driven, and a second vane assembly including a plurality of second vanes which are tiltable in a position adjacent to the plurality of first vanes, and a second driving mechanism by which the plurality of second vanes are driven.

As the plurality of first vanes and the plurality of second vanes are tiltable, the direction of air flow exiting from the air outlet may be changed or adjusted. By adjusting the tilting position of the first vane and the tilting position of the second vane according to drive modes of the vehicle, the aerodynamic performance, the cooling performance of the heat exchanger, and the brake cooling performance of the brake mechanism may be optimally improved.

The plurality of first vanes may be located in front of the air outlet of the front wheel house, and the plurality of second vanes may be located in front of the plurality of first vanes.

The plurality of first vanes and the plurality of second vanes may be tilted on the upstream side of the air outlet of the front wheel house, thereby changing or adjusting the direction of air flow exiting from the air outlet of the front wheel house inwards/outwards and upwards/downwards. Thus, the direction of air flow from the air outlet of the front wheel house may be appropriately adjusted to be suitable for various drive modes (driving conditions).

The first vane assembly may include a plurality of first shafts provided to the plurality of first vanes, respectively, and an axis of the first shaft may be aligned with a central longitudinal axis of the first vane.

The central longitudinal axis of the first vane and the axis of the first shaft may extend in a width direction of the vehicle.

Accordingly, the first vane may be tilted around the axis of the first shaft at a predetermined tilting angle.

The second vane assembly may include a plurality of second shafts provided to the plurality of second vanes, respectively, and an axis of the second shaft may be aligned with a central longitudinal axis of the second vane.

The central longitudinal axis of the second vane and the axis of the second shaft may extend in a height direction of the vehicle.

Accordingly, the second vane may be tilted around the axis of the second shaft at a predetermined tilting angle.

The central longitudinal axis of the second vane may be perpendicular to the central longitudinal axis of the first vane, and the axis of the second shaft may be perpendicular to the axis of the first shaft.

As the first vanes and the second vanes are perpendicular to each other, the air flow from the air outlet of the front wheel house may be guided in various directions through the first vanes and the second vanes.

The first driving mechanism may include a first actuator, and a first power transmission transmitting power of the first actuator to the plurality of first shafts.

According to an exemplary embodiment, the first power transmission may include a first drive member moving linearly by the first actuator, and a plurality of first driven members rotated by the first drive member. The plurality of first driven members may be fixed to the plurality of first shafts, respectively.

The first actuator may be a linear actuator causing the first drive member to move linearly, the first drive member may be a rack gear having a plurality of rack teeth spaced apart from each other at a predetermined linear pitch, and each first driven member may be a pinion gear having a plurality of teeth spaced apart from each other at a predetermined circular pitch.

According to another exemplary embodiment, the first power transmission may include a first drive pulley connected to the first actuator, a plurality of first driven pulleys fixed to the plurality of first shafts, respectively, and a first belt wound between the first drive pulley and the plurality of first driven pulleys.

The first actuator may be a drive motor causing the first drive pulley to rotate, the first drive pulley may be a toothed pulley having a plurality of teeth spaced apart from each other at a predetermined circular pitch on an inner circumferential surface thereof, each first driven pulley may be a toothed pulley having a plurality of teeth spaced apart from each other at a predetermined circular pitch on an outer circumferential surface thereof, and the first belt may be a timing belt having a plurality of teeth meshing with the teeth of the first drive pulley and the teeth of the first driven pulley.

The second driving mechanism may include a second actuator, and a second power transmission transmitting power of the second actuator to the plurality of second shafts.

The second power transmission may include a second drive member moving linearly by the second actuator, and a plurality of second driven members rotated by the second drive member. The plurality of second driven members may be fixed to the plurality of second shafts, respectively.

According to an exemplary embodiment, the second actuator may be a linear actuator causing the second drive member to move linearly, the second drive member may be a rack gear having a plurality of rack teeth spaced apart from each other at a predetermined linear pitch, and each second driven member may be a pinion gear having a plurality of teeth spaced apart from each other at a predetermined circular pitch.

According to another exemplary embodiment, the second power transmission may include a second drive pulley connected to the second actuator, a plurality of second driven pulleys fixed to the plurality of second shafts, respectively, and a second belt wound between the second drive pulley and the plurality of second driven pulleys.

The second actuator may be a drive motor causing the second drive pulley to rotate, the second drive pulley may be a toothed pulley having a plurality of teeth spaced apart from each other at a predetermined circular pitch on an inner circumferential surface thereof, each second driven pulley may be a toothed pulley having a plurality of teeth spaced apart from each other at a predetermined circular pitch on an outer circumferential surface thereof, and the second belt may be a timing belt having a plurality of teeth meshing with the teeth of the second drive pulley and the teeth of the second driven pulley.

The air guide apparatus may further include a controller controlling the first driving mechanism and the second driving mechanism. The controller may control the first driving mechanism and the second driving mechanism to adjust a tilting position of the first vane and a tilting position of the second vane to position modes predetermined according to drive modes of the vehicle selected by a driver.

The position modes may include a cooling optimum position mode, a brake cooling optimum position mode, an aerodynamic optimum position mode, and a multi-objective optimum position mode.

For example, when the driver selects a cooling performance mode, the tilting position of the first vane and the tilting position of the second vane may be automatically adjusted to the cooling optimum position mode by the controller. When the driver selects a braking performance mode, the tilting position of the first vane and the tilting position of the second vane may be automatically adjusted to the brake cooling optimum position mode by the controller. When the driver selects a cruise mode, the tilting position of the first vane and the tilting position of the second vane may be automatically adjusted to the aerodynamic optimum position mode by the controller. When the driver selects a normal mode, the tilting position of the first vane and the tilting position of the second vane may be automatically adjusted to the multi-objective optimum position mode by the controller.

In the cooling optimum position mode, the first vane may be in a first cooling position, and the second vane may be in a second cooling position.

In the brake cooling optimum position mode, the first vane may be in a first brake position, and the second vane may be in a second brake position.

In the aerodynamic optimum position mode, the first vane may be in a first aerodynamic position, and the second vane may be in a second aerodynamic position.

In the multi-objective optimum position mode, the first vane may be in a first simultaneous optimal position, and the second vane may be in a second simultaneous optimal position.

A tilting angle of the first vane in the first cooling position may be greater than that of the first vane in the first brake position, a tilting angle of the first vane in the first brake position may be greater than that of the first vane in the first aerodynamic position, and a tilting angle of the first vane in the first simultaneous optimal position may be greater than that of the first vane in the first cooling position.

A tilting angle of the second vane in the second aerodynamic position may be greater than that of the second vane in the second brake position, a tilting angle of the second vane in the second brake position may be greater than that of the second vane in the second cooling position, and a tilting angle of the second vane in the second simultaneous optimal position may be less than that of the second vane in the second brake position and be greater than that of the second vane in the second cooling position.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
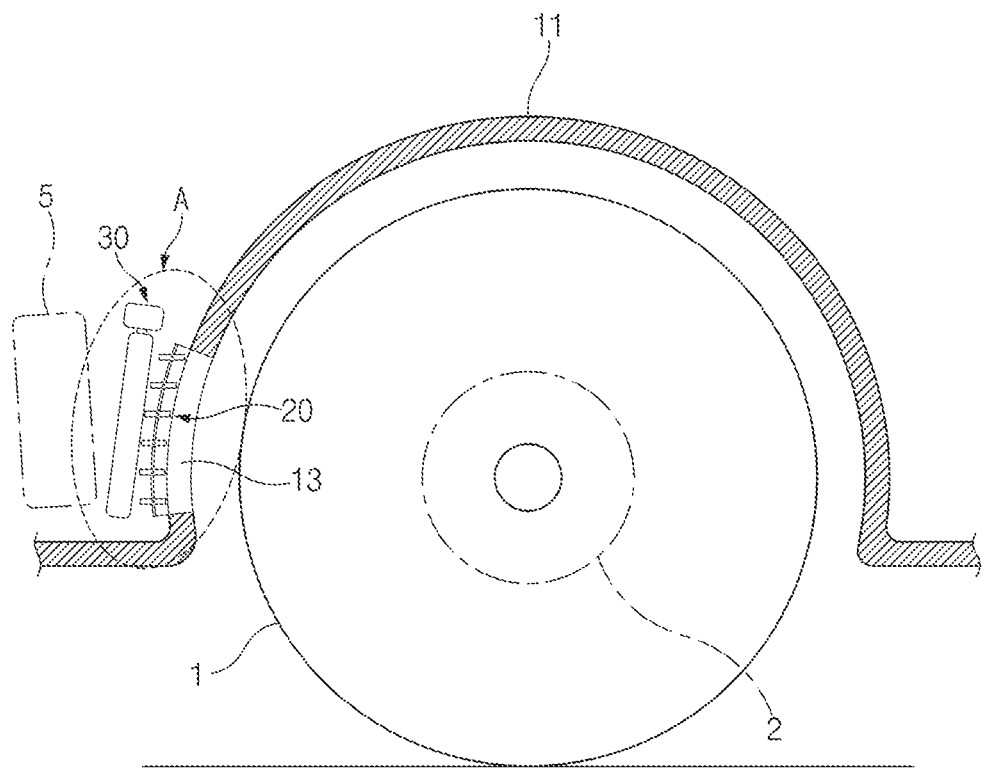
FIG. 1 illustrates an air guide apparatus for a vehicle according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
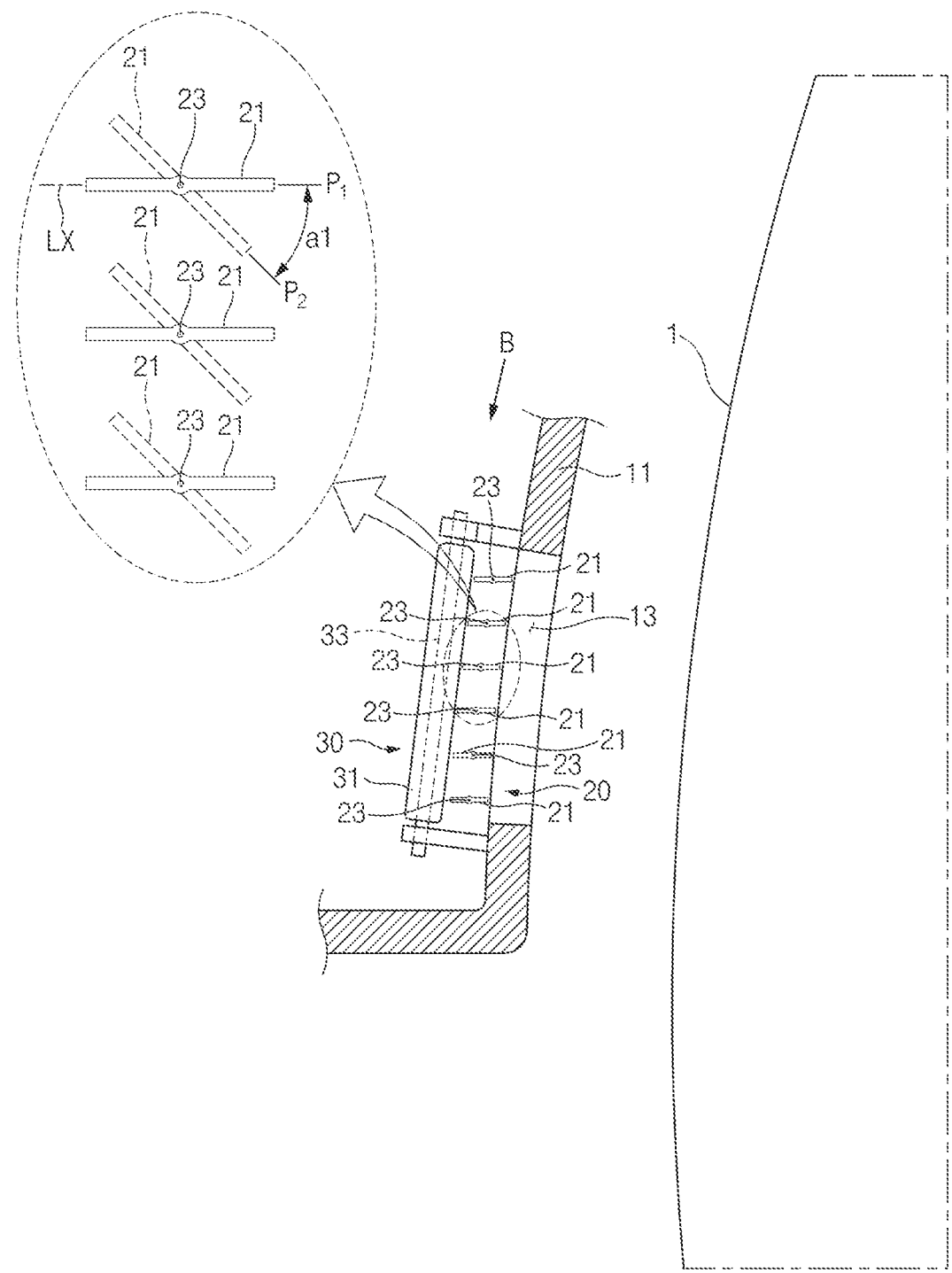
FIG. 2 illustrates an enlarged view of portion A of FIG. 1.
Figure 3:
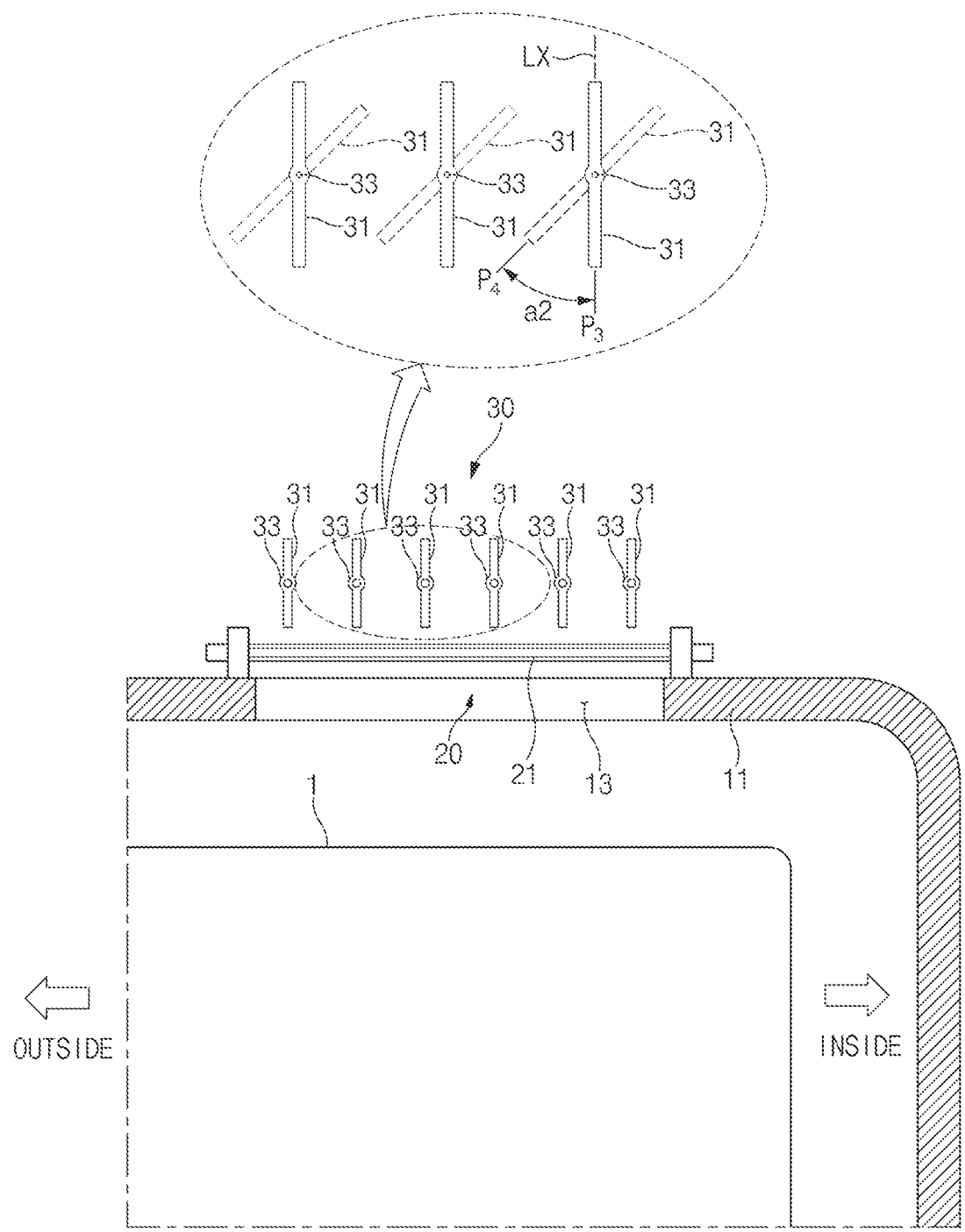
FIG. 3 illustrates a view which is viewed in a direction indicated by arrow B of FIG. 2.

Referring to FIGS. 1 to 3, an air guide apparatus for a vehicle according to an exemplary embodiment of the present disclosure may include a front wheel housing 11 having an air outlet 13 which is open to a front wheel 1, a first vane assembly 20 adjacent to the air outlet 13 of the front wheel 1, and a second vane assembly 30 adjacent to the first vane assembly 20.

The front wheel housing 11 may surround a front wheel 1, and the air outlet 13 may be provided in a front portion of the front wheel housing 11. Accordingly, air flowing into the inside of the vehicle may flow out toward the front wheel 1 through the air outlet 13.

The vehicle may have a front grille mounted on a front end thereof, and the front grille may have a plurality of openings permitting the air to be directed toward the front compartment. The front compartment may receive a plurality of heat exchangers such as a condenser, a radiator, and an intercooler. In addition, the front compartment may receive a mechanical powertrain including an internal combustion engine and/or an electric powertrain including an electric motor.

Referring to FIG. 1, a brake mechanism 2 may be provided to the front wheel 1, and an auxiliary heat exchanger 5 such as an auxiliary radiator may be located upstream of the front wheel housing 11. The air may flow into the inside of the vehicle through the front grille provided in the center of the front end of the vehicle or a side inlet provided in each side of the front end of the vehicle. A portion of the air flowing into the inside of the vehicle may pass through the auxiliary heat exchanger 5 located upstream of the front wheel housing 11 and be directed toward the brake mechanism 2 of the front wheel 1 through the air outlet 13 of the front wheel housing 11.

Referring to FIGS. 2 and 3, the first vane assembly 20 may be located in front of the air outlet 13 of the front wheel housing 11, and the second vane assembly 30 may be located in front of the first vane assembly 20. The first vane assembly 20 and the second vane assembly 30 may be disposed between the auxiliary heat exchanger 5 and the air outlet 13 of the front wheel housing 11. A plurality of first vanes 21 and a plurality of second vanes 31 may be tiltable in front of the air outlet 13 of the front wheel housing 11 so that the direction of air flow exiting from the air outlet 13 of the front wheel housing 11 may be changed or adjusted in various ways, and thus the air flows may be combined in various modes.

Figure 4:
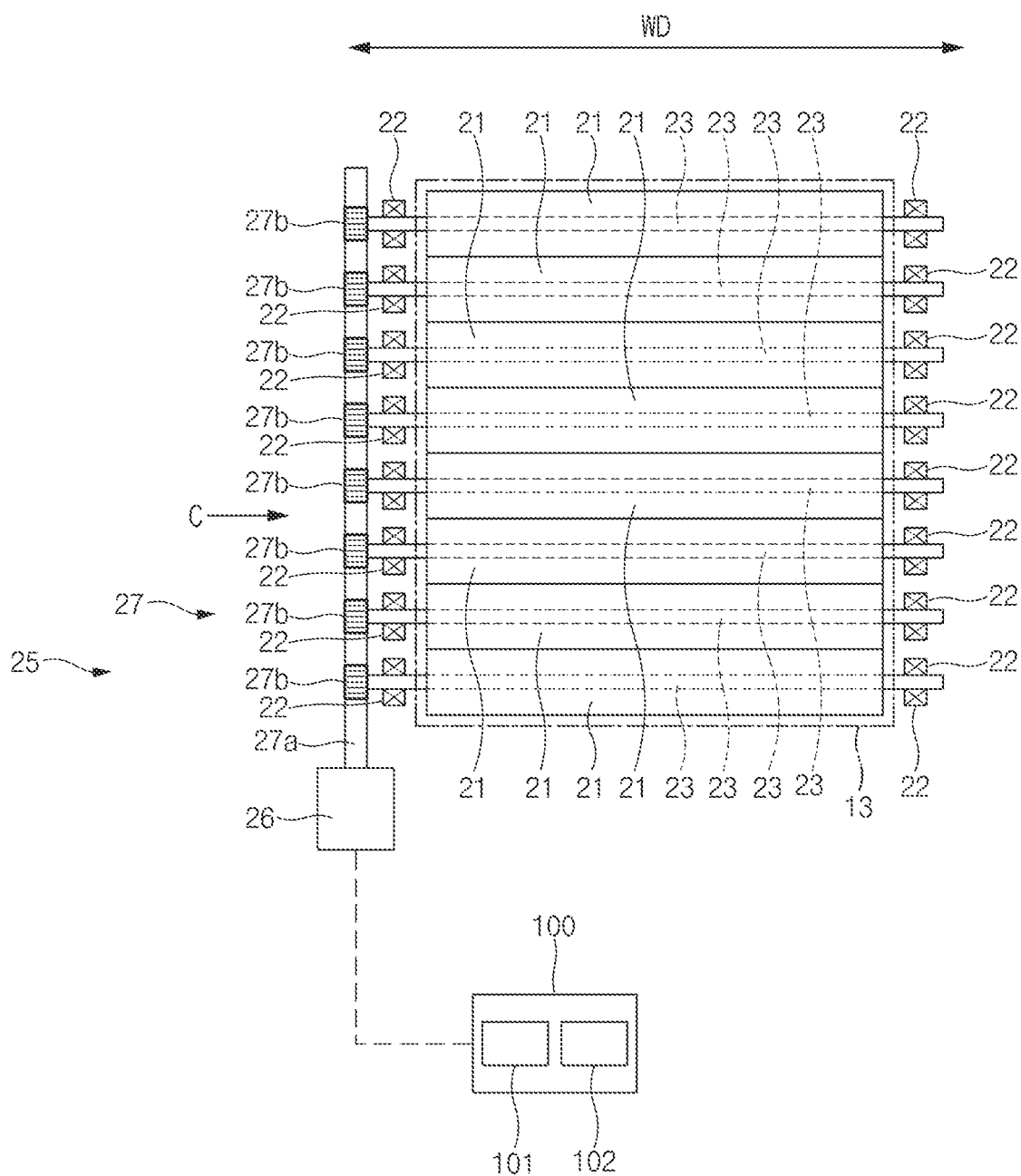
FIG. 4 illustrates a first vane assembly of an air guide apparatus for a vehicle according to an exemplary embodiment of the present disclosure.

Referring to FIG. 4, the first vane assembly 20 may include the plurality of first vanes 21 which are tiltable, and a first driving mechanism 25 by which the plurality of first vanes 21 are driven.

The plurality of first vanes 21 may be tiltable in a position adjacent to the air outlet 13. Each of the plurality of first vanes 21 may have a first shaft 23. An axis of the first shaft 23 may be aligned with a central longitudinal axis of the first vane 21. According to an exemplary embodiment, as illustrated in FIG. 4, the first shaft 23 may extend through the longitudinal center of the first vane 21, and both ends of the first shaft 23 may protrude from both ends of the first vane 21. According to another exemplary embodiment, the first shaft 23 may include a pair of shaft pins protruding from both ends of the first vane 21, respectively, and the first shaft 23 may not extend through the longitudinal center of the first vane 21.

Referring to FIG. 4, the central longitudinal axis of the first vane 21 and the axis of the first shaft 23 may extend in a width direction WD of the vehicle, and the first vane 21 may be tilted around the axis of the first shaft 23 parallel to the width direction of the vehicle.

Referring to FIG. 2, as the first vane 21 is tilted around the axis of the first shaft 23, the first vane 21 may move between a first minimum tilting position $P_1$ and a first maximum tilting position $P_2$. The first minimum tilting position $P_1$ and the first maximum tilting position $P_2$ may define a predetermined first tilting angle range a1. As the first vane 21 is tilted at a predetermined tilting angle within the first tilting angle range a1, the axis of the first vane 21 may coincide with or intersect a longitudinal axis LX of the vehicle at a predetermined angle. The first minimum tilting position $P_1$ may be aligned with the longitudinal axis LX of the vehicle, and when the first vane 21 is in the first minimum tilting position $P_1$, the first vane 21 may have a tilting angle of 0°. In particular, when the first vane 21 is in the first minimum tilting position $P_1$, the air outlet 13 may be fully opened, and accordingly the first vane 21 may guide the direction of air flow exiting from the air outlet 13 opposite to the driving direction of the vehicle straightly. When the first vane 21 is in the first maximum tilting position $P_2$, the first vane 21 may be tilted toward the front wheel 1 of the vehicle at a predetermined tilting angle. For example, the tilting angle may be 50-60°, particularly 55°. When the first vane 21 is in the first maximum tilting position $P_2$, the first vane 21 may guide the direction of air flow exiting from the air outlet 13 downwardly.

Both ends of the first shaft 23 may be rotatably supported by a pair of first rotating support structures 22. Each first rotating support structure 22 may include a bearing, and the first rotating support structure 22 may be mounted on a structure located in the vehicle or the front wheel housing 11 through brackets and/or the like.

According to an exemplary embodiment, the first driving mechanism 25 may include a first actuator 26, and a first power transmission 27 transmitting power of the first actuator 26 to the plurality of first shafts 23.

The first power transmission 27 may include a first drive member 27a moving linearly by the first actuator 26, and a plurality of first driven members 27b rotated by the first drive member 27a. The plurality of first driven members 27b may be fixed to the plurality of first shafts 23, respectively.

Figure 5:
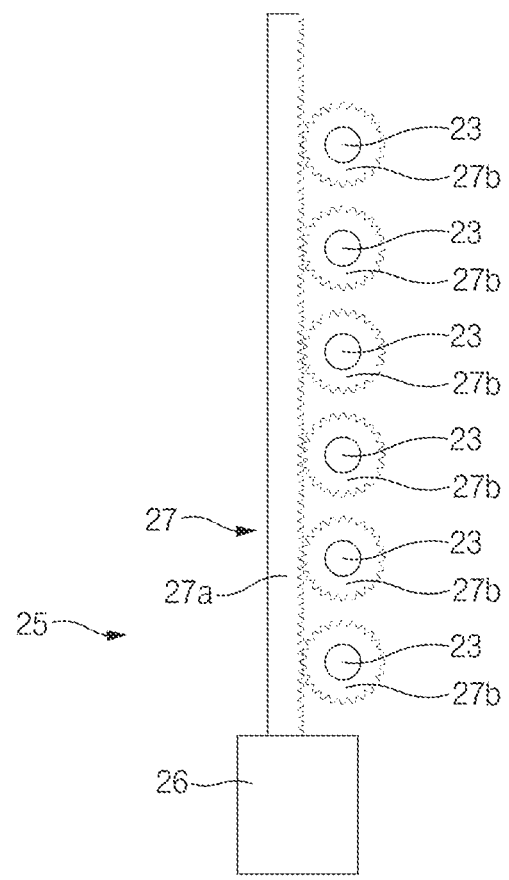
FIG. 5 illustrates a view which is viewed in a direction indicated by arrow C of FIG. 4.

Referring to FIG. 5, the first actuator 26 may be a linear actuator causing the first drive member 27a to move linearly. The first drive member 27a may be a rack gear having a plurality of rack teeth spaced apart from each other at a predetermined linear pitch, and each first driven member 27b may be a pinion gear having a plurality of teeth spaced apart from each other at a predetermined circular pitch.

Figure 6:
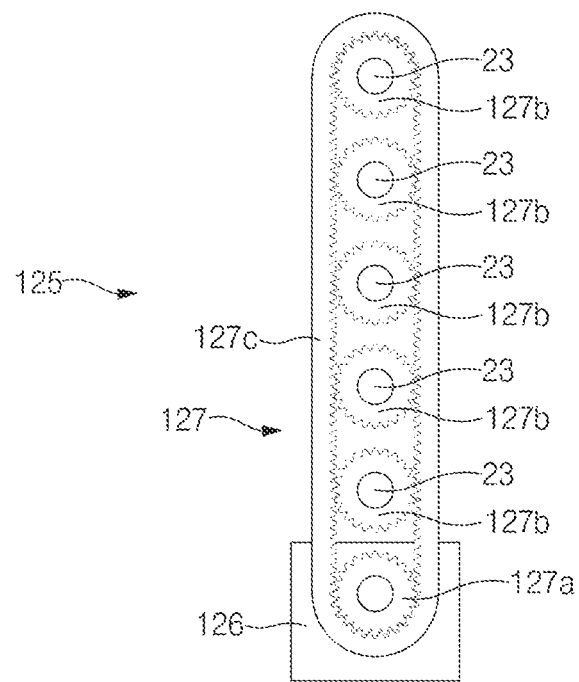
FIG. 6 illustrates a modification to the embodiment of FIG. 5.

FIG. 6 illustrates a first driving mechanism 125 according to another exemplary embodiment of the present disclosure. Referring to FIG. 6, the first driving mechanism 125 may include a first actuator 126, and a first power transmission 127 transmitting power of the first actuator 126 to the plurality of first shafts 23.

The first power transmission 127 may include a first drive pulley 127a connected to the first actuator 126, a plurality of first driven pulleys 127b fixed to the plurality of first shafts 23, respectively, and a first belt 127c wound between the first drive pulley 127a and the plurality of first driven pulleys 127b.

The first actuator 126 may be a drive motor causing the first drive pulley 127a to rotate. The first drive pulley 127a may be a toothed pulley having a plurality of teeth spaced apart from each other at a predetermined circular pitch on an inner circumferential surface thereof, and each first driven pulley 127b may be a toothed pulley having a plurality of teeth spaced apart from each other at a predetermined circular pitch on an outer circumferential surface thereof. The first belt 127c may be a timing belt or a toothed belt having a plurality of teeth meshing with the teeth of the first drive pulley 127a and the teeth of the first driven pulley 127b.

The plurality of first vanes 21 may be tilted in the same direction by the first driving mechanism 25 or 125, and accordingly the plurality of first vanes 21 may be tilted at the same tilting angle.

Figure 7:
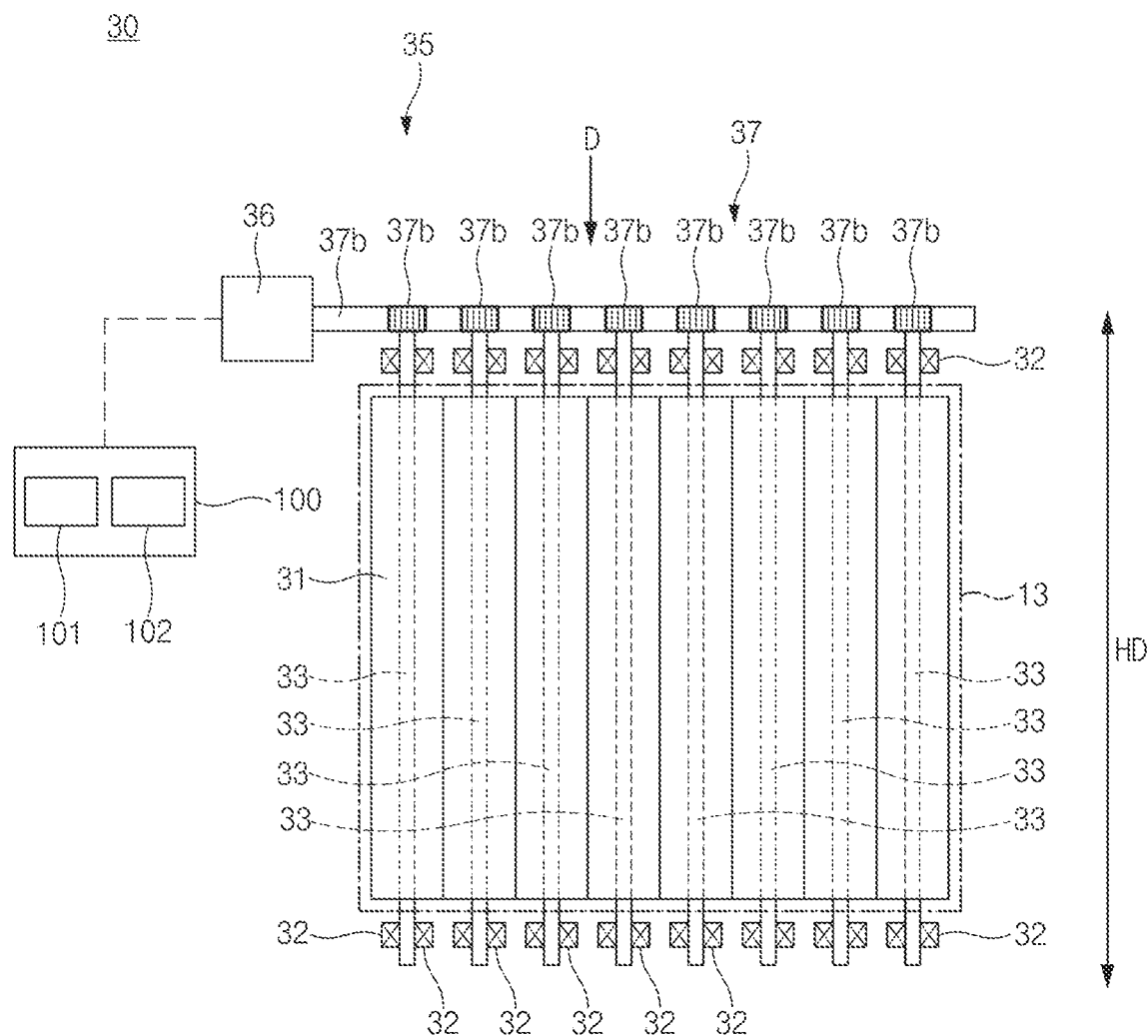
FIG. 7 illustrates a second vane assembly of an air guide apparatus for a vehicle according to an exemplary embodiment of the present disclosure.

Referring to FIG. 7, the second vane assembly 30 may include the plurality of second vanes 31 which are tiltable, and a second driving mechanism 35 by which the plurality of second vanes 31 are driven.

The plurality of second vanes 31 may be tiltable in a position adjacent to the plurality of first vanes 21. A plurality of second shafts 33 may be provided to the plurality of second vanes 31, respectively. An axis of the second shaft 33 may be aligned with a central longitudinal axis of the second vane 31. According to an exemplary embodiment, as illustrated in FIG. 7, the second shaft 33 may extend through the longitudinal center of the second vane 31, and both ends of the second shaft 33 may protrude from both ends of the second vane 31. According to another exemplary embodiment, the second shaft 33 may include a pair of shaft pins protruding from both ends of the second vane 31, respectively, and the second shaft 33 may not extend through the longitudinal center of the second vane 31.

Referring to FIG. 7, the central longitudinal axis of the second vane 31 and the axis of the second shaft 33 may extend in a height direction HD of the vehicle, and the second vane 31 may be tilted or rotated around the axis of the second shaft 33 parallel to the height direction of the vehicle. In particular, the central longitudinal axis of the second vane 31 may be perpendicular to the central longitudinal axis of the first vane 21, and accordingly the axis of the second shaft 33 may be perpendicular to the axis of the first shaft 23.

Referring to FIG. 3, as the second vane 31 is tilted around the axis of the second shaft 33, the second vane 31 may move between a second minimum tilting position $P_3$ and a second maximum tilting position $P_4$. The second minimum tilting position $P_3$ and the second maximum tilting position $P_4$ may define a predetermined second tilting angle range a2. As the second vane 31 is tilted at a predetermined tilting angle within the second tilting angle range a2, the axis of the second vane 31 may coincide with or intersect the longitudinal axis LX of the vehicle at a predetermined angle. The second minimum tilting position $P_3$ may be aligned with the longitudinal axis LX of the vehicle, and when the second vane 31 is in the second minimum tilting position $P_3$, the second vane 31 may have a tilting angle of 0°. In particular, when the second vane 31 is in the second minimum tilting position $P_3$, the air outlet 13 may be fully opened, and accordingly the second vane 31 may guide the direction of air flow exiting from the air outlet 13 opposite to the driving direction of the vehicle straightly. When the second vane 31 is in the second maximum tilting position $P_4$, the second vane 31 may be tilted toward the outside of the vehicle, particularly, the outside of the front wheel 1 of the vehicle at a predetermined tilting angle. For example, the tilting angle may be 50-70°, particularly 60°. When the second vane 31 is in the second maximum tilting position $P_4$, the second vane 31 may guide the direction of air flow exiting from the air outlet 13 toward the outside of the vehicle.

Both ends of the second shaft 33 may be rotatably supported by a pair of second rotating support structures 32. Each second rotating support structure 32 may include a bearing, and the second rotating support structure 32 may be mounted on a structure located in the vehicle or the front wheel housing 11 through brackets and/or the like.

According to an exemplary embodiment, the second driving mechanism 35 may include a second actuator 36, and a second power transmission 37 transmitting power of the second actuator 36 to the plurality of second shafts 33.

The second power transmission 37 may include a second drive member 37a moving linearly by the second actuator 36, and a plurality of second driven members 37b rotated by the second drive member 37a. The plurality of second driven members 37b may be fixed to the plurality of second shafts 33, respectively.

Figure 8:
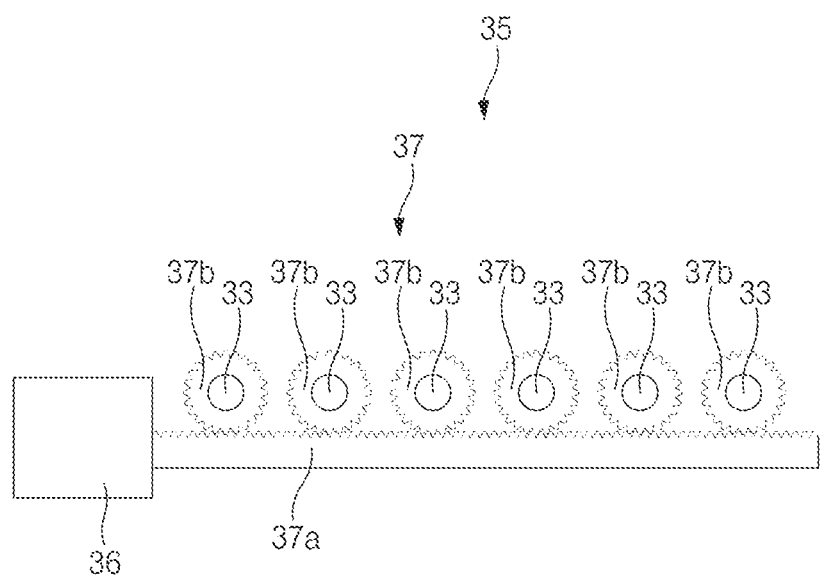
FIG. 8 illustrates a view which is viewed in a direction indicated by arrow D of FIG. 7.

Referring to FIG. 8, the second actuator 36 may be a linear actuator causing the second drive member 37a to move linearly. The second drive member 37a may be a rack gear having a plurality of rack teeth spaced apart from each other at a predetermined linear pitch, and each second driven member 37b may be a pinion gear having a plurality of teeth spaced apart from each other at a predetermined circular pitch.

Figure 9:
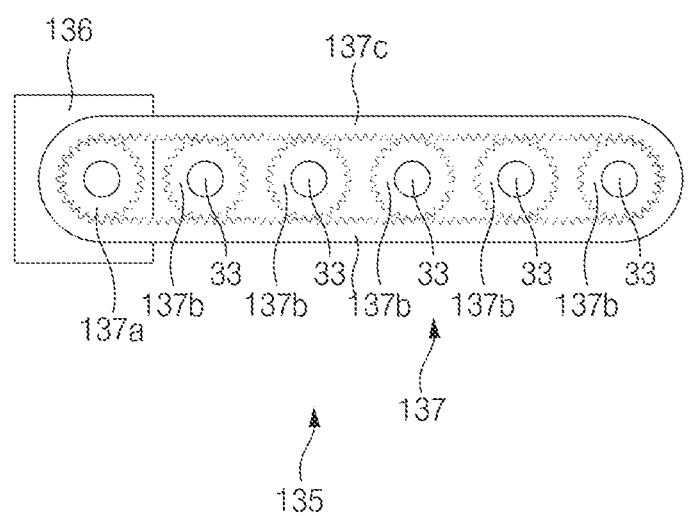
FIG. 9 illustrates a modification to the embodiment of FIG. 8.

FIG. 9 illustrates a second driving mechanism 135 according to another exemplary embodiment of the present disclosure. Referring to FIG. 9, the second driving mechanism 135 may include a second actuator 136, and a second power transmission 137 transmitting power of the second actuator 136 to the plurality of second shafts 33.

The second power transmission 137 may include a second drive pulley 137a connected to the second actuator 136, a plurality of second driven pulleys 137b fixed to the plurality of second shafts 33, respectively, and a second belt 137c wound between the second drive pulley 137a and the plurality of second driven pulleys 137b.

The second actuator 136 may be a drive motor causing the second drive pulley 137a to rotate. The second drive pulley 137a may be a toothed pulley having a plurality of teeth spaced apart from each other at a predetermined circular pitch on an inner circumferential surface thereof, and each second driven pulley 137b may be a toothed pulley having a plurality of teeth spaced apart from each other at a predetermined circular pitch on an outer circumferential surface thereof. The second belt 137c may be a timing belt or a toothed belt having a plurality of teeth meshing with the teeth of the second drive pulley 137a and the teeth of the second driven pulley 137b.

The plurality of second vanes 31 may be tilted in the same direction by the second driving mechanism 35 or 135, and accordingly the plurality of second vanes 31 may be tilted at the same tilting angle.

Referring again to FIG. 4, a controller 100 may control the first actuator 26 or 126 of the first driving mechanism 25 or 125 and the second actuator 36 or 136 of the second driving mechanism 35 or 135. The controller 100 may include a processor 101 and a memory 102. The processor 101 may receive instructions stored in the memory 102, and be programmed to transmit instructions to the first actuator 26 or 126 and the second actuator 36 or 136. The memory 102 may be a data store such as a hard disk drive, a solid state drive, a server, a volatile storage medium, or a non-volatile storage medium.

The controller 100 may control the first actuator 26 or 126 and the second actuator 36 or 136 to change or adjust the tilting position of the first vane 21 and the tilting position of the second vane 31. The tilting position of the first vane 21 may be adjusted within the first tilting angle range a1, and the tilting position of the second vane 31 may be adjusted within the second tilting angle range a2. Accordingly, the direction of air flow exiting from the air outlet 13 of the front wheel housing 11 may be changed or adjusted in various flow directions. For example, the controller 100 may receive information on the drive mode of the vehicle such as a vehicle speed and a coolant temperature of the internal combustion engine from a vehicle controller, various sensors, and the like through CAN communications, and the controller 100 may control the first actuator and the second actuator based on the received information.

Figure 10:
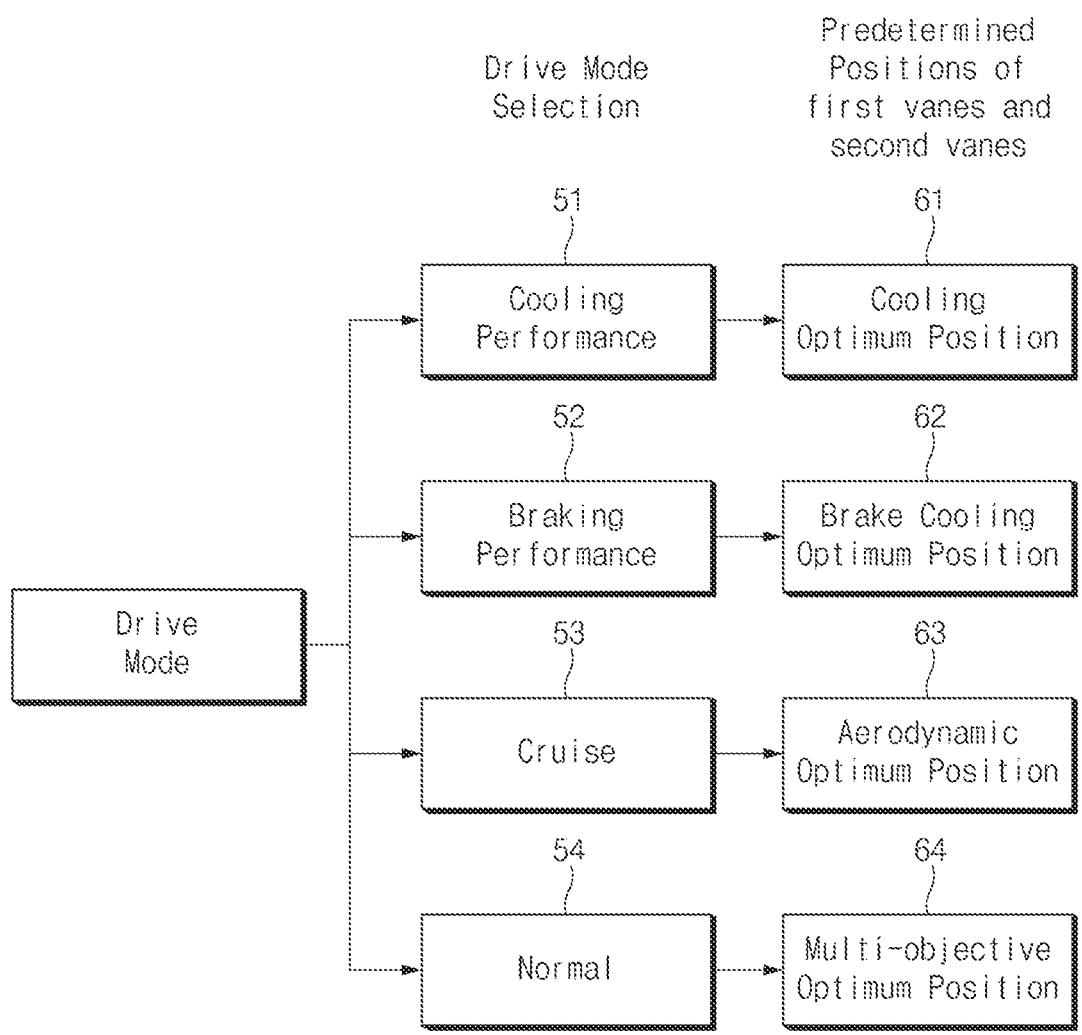
FIG. 10 illustrates a block diagram of various drive modes of a vehicle and various position modes related thereto.

A vehicle to which the air guide apparatus according to an exemplary embodiment of the present disclosure is applied may operate in various drive modes selected by a driver. Referring to FIG. 10, various drive modes may include a cooling performance mode 51, a braking performance mode 52, a cruise mode 53, and a normal mode 54. In the cooling performance mode 51, the cooling performance of a heat exchanger such as an auxiliary radiator adjacent to the front wheel housing 11 and a radiator adjacent to the front grille may be improved while the vehicle is driving. In the braking performance mode 52, the braking performance of the vehicle may be improved by the brake mechanism 2 as the air flow to the brake mechanism 2 of the front wheel 1 is adjusted. In the cruise mode 53, the speed of the vehicle may be kept constant. In the normal mode 54, the vehicle may travel normally.

The tilting position of each of the first vanes 21 and the tilting position of each of the second vanes 31 may be adjusted and determined by the controller 100. In particular, the tilting position of the first vane 21 and the tilting position of the second vane 31 may be predetermined in accordance with individual drive modes 51, 52, 53, and 54, and the tilting position of the first vane 21 and the tilting position of the second vane 31 may be predetermined as various position modes.

Referring to FIG. 10, various position modes may include a cooling optimum position mode 61, a brake cooling optimum position mode 62, an aerodynamic optimum position mode 63, and a multi-objective optimum position mode 64. In the cooling optimum position mode 61, the tilting position of the first vane 21 and the tilting position of the second vane 31 may be predetermined to preferentially optimize the cooling performance of the heat exchanger. In the brake cooling optimum position mode 62, the tilting position of the first vane 21 and the tilting position of the second vane 31 may be predetermined to preferentially optimize cooling performance with respect to the brake mechanism 2 of the front wheel 1. In the aerodynamic optimum position mode 63, the tilting position of the first vane 21 and the tilting position of the second vane 31 may be predetermined to preferentially optimize the aerodynamic performance. In the multi-objective optimum position mode 64, the tilting position of the first vane 21 and the tilting position of the second vane 31 may be predetermined according to various objectives.

Data related to the drive modes 51, 52, 53, and 54 and the position modes 61, 62, 63, and 64 may be stored in the memory 102 of the controller 100, and the processor 101 of the controller 100 may control the first actuator 26 or 126 of the first driving mechanism 25 or 125 and the second actuator 36 or 136 of the second driving mechanism 35 or 135 according to the drive mode selected by the driver so that the tilting position of the first vane 21 and the tilting position of the second vane 31 may be adjusted to the corresponding position mode. For example, when the driver selects the cooling performance mode 51, the tilting position of the first vane 21 and the tilting position of the second vane 31 may be automatically adjusted to the cooling optimum position mode 61 by the controller 100. When the driver selects the braking performance mode 52, the tilting position of the first vane 21 and the tilting position of the second vane 31 may be automatically adjusted to the brake cooling optimum position mode 62 by the controller 100. When the driver selects the cruise mode 53, the tilting position of the first vane 21 and the tilting position of the second vane 31 may be automatically adjusted to the aerodynamic optimum position mode 63 by the controller 100. When the driver selects the normal mode 54, the tilting position of the first vane 21 and the tilting position of the second vane 31 may be automatically adjusted to the multi-objective optimum position mode 64 by the controller 100.

Figure 11:
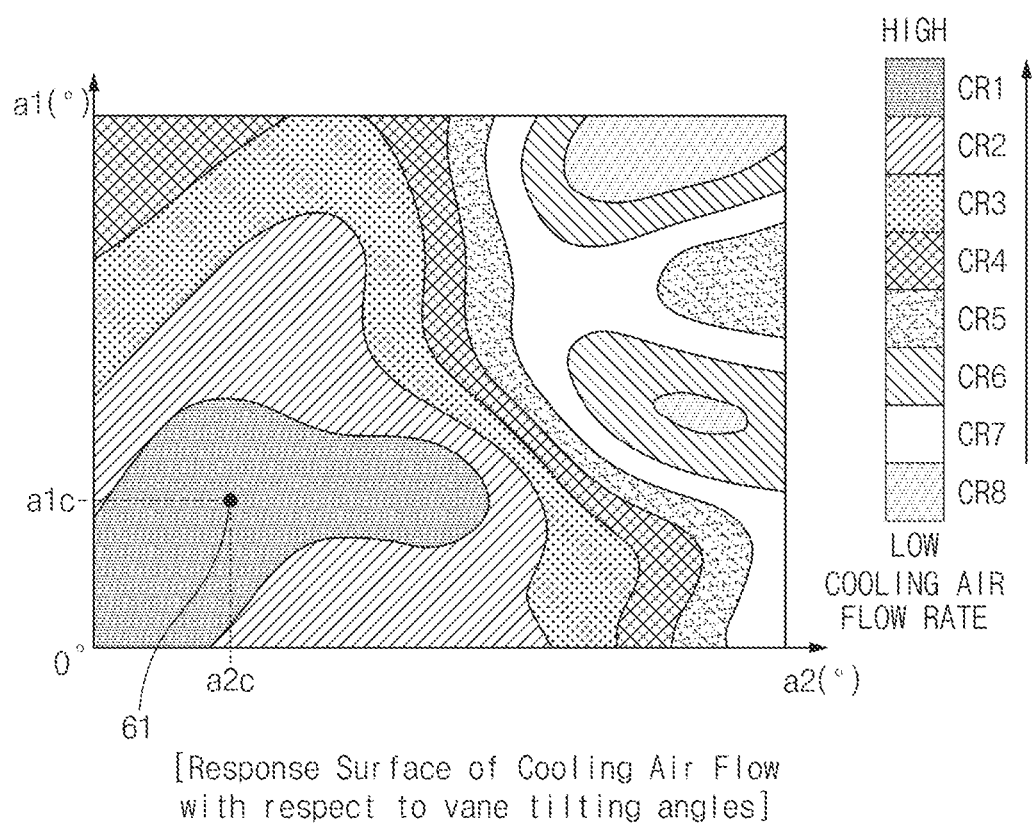
FIG. 11 illustrates a graph of a response surface of cooling air flow according to a tilting position of a first vane and a tilting position of a second vane.

FIG. 11 illustrates a graph of a response surface of cooling air flow passing through the heat exchanger such as the auxiliary heat exchanger 5, particularly, a change in cooling air flow rate according to a tilting position a1 of the first vane 21 and a tilting position a2 of the second vane 31. In FIG. 11, the cooling air flow rate is the highest in region CR1, and gradually decreases in a direction toward region CR2, region CR3, region CR4, region CR5, region CR6, region CR7, and region CR8. Since the cooling air flow rate is the highest in region CR1, the cooling optimum position mode 61 may be determined in region CR1. In the cooling optimum position mode 61, the first vane 21 may be in a first cooling position a1c, and the second vane 31 may be in a second cooling position a2c. For example, a tilting angle of the first vane 21 in the first cooling position a1c may be greater than that of the second vane 31 in the second cooling position a2c. Accordingly, the air exiting from the air outlet 13 may be guided toward the bottom of the vehicle by the first vane 21 and simultaneously be guided toward the front wheel 1 and the inside of the front wheel housing 11 (the inside of the vehicle) by the second vane 31.

Figure 12:
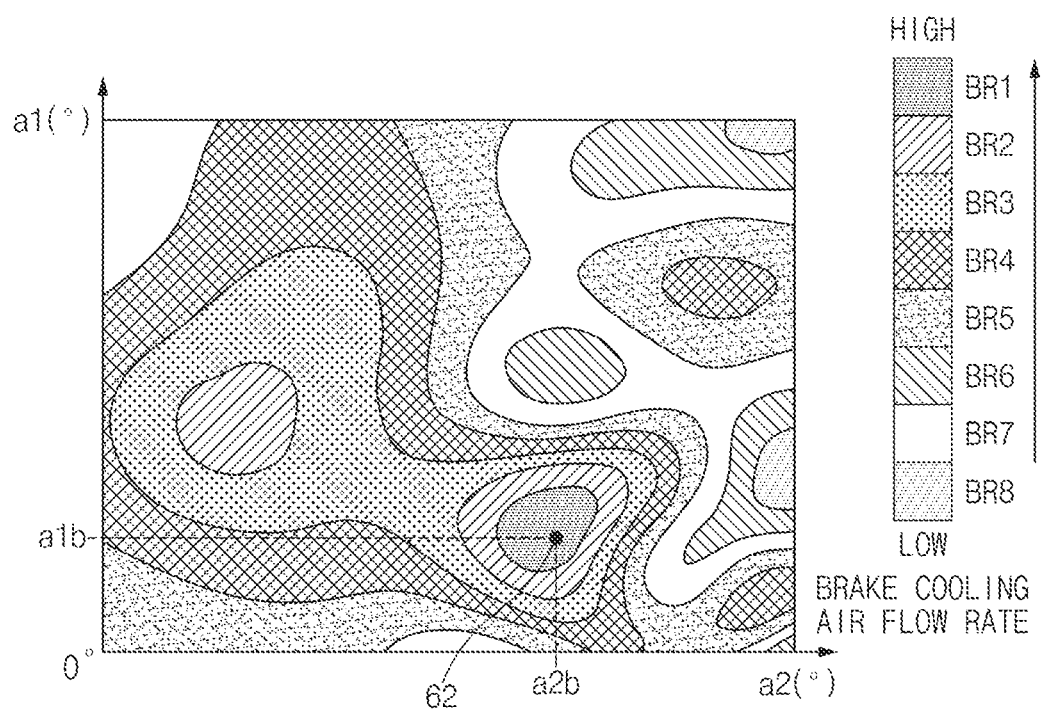
FIG. 12 illustrates a graph of a response surface of brake cooling air flow according to a tilting position of a first vane and a tilting position of a second vane.

FIG. 12 illustrates a graph of a response surface of brake cooling air flow passing through the brake mechanism 2 of the front wheel 1, particularly, a change in brake cooling air flow rate according to the tilting position a1 of the first vane 21 and the tilting position a2 of the second vane 31. In FIG. 12, the brake cooling air flow rate is the highest in region BR1, and gradually decreases in a direction toward region BR2, region BR3, region BR4, region BR5, region BR6, region BR7, and region BR8. Since the brake cooling air flow rate is the highest in region BR1, the brake cooling optimum position mode 62 may be determined in region BR1. In the brake cooling optimum position mode 62, the first vane 21 may be in a first brake position a1b, and the second vane 31 may be in a second brake position a2b. For example, a tilting angle of the second vane 31 in the second brake position a2b may be greater than that of the first vane 21 in the first brake position a1b. Accordingly, the air exiting from the air outlet 13 may be directly guided toward calipers and disc vanes of the brake mechanism 2 by the first vane 21 and the second vane 31.

Figure 13:
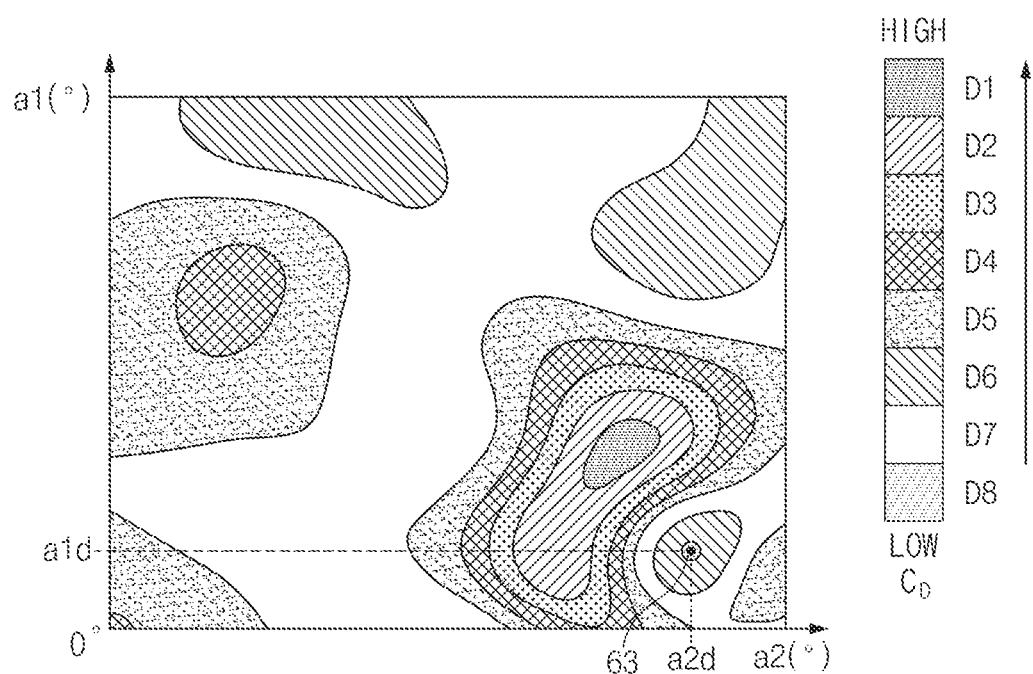
FIG. 13 illustrates a graph of a response surface of drag coefficient according to a tilting position of a first vane and a tilting position of a second vane.

FIG. 13 illustrates a graph of a response surface of drag coefficient CD while the vehicle is driving, particularly, a change in drag coefficient CD according to the tilting position a1 of the first vane 21 and the tilting position a2 of the second vane 31. In FIG. 13, the drag coefficient CD is the highest in region D1, and gradually decreases in a direction toward region D2, region D3, region D4, region D5, region D6, region D7, and region D8. Since the drag coefficient CD is the lowest in region D8, the aerodynamic optimum position mode 63 may be determined in region D8. In the aerodynamic optimum position mode 63, the first vane 21 may be in a first aerodynamic position a1d, and the second vane 31 may be in a second aerodynamic position a2d. For example, a tilting angle of the second vane 31 in the second aerodynamic position a2d may be greater than that of the first vane 21 in the first aerodynamic position a1d. Accordingly, the air exiting from the air outlet 13 may be guided toward an upper portion of the front wheel 1 by the first vane 21 and simultaneously be guided toward the outside of the vehicle by the second vane 31.

Figure 14:
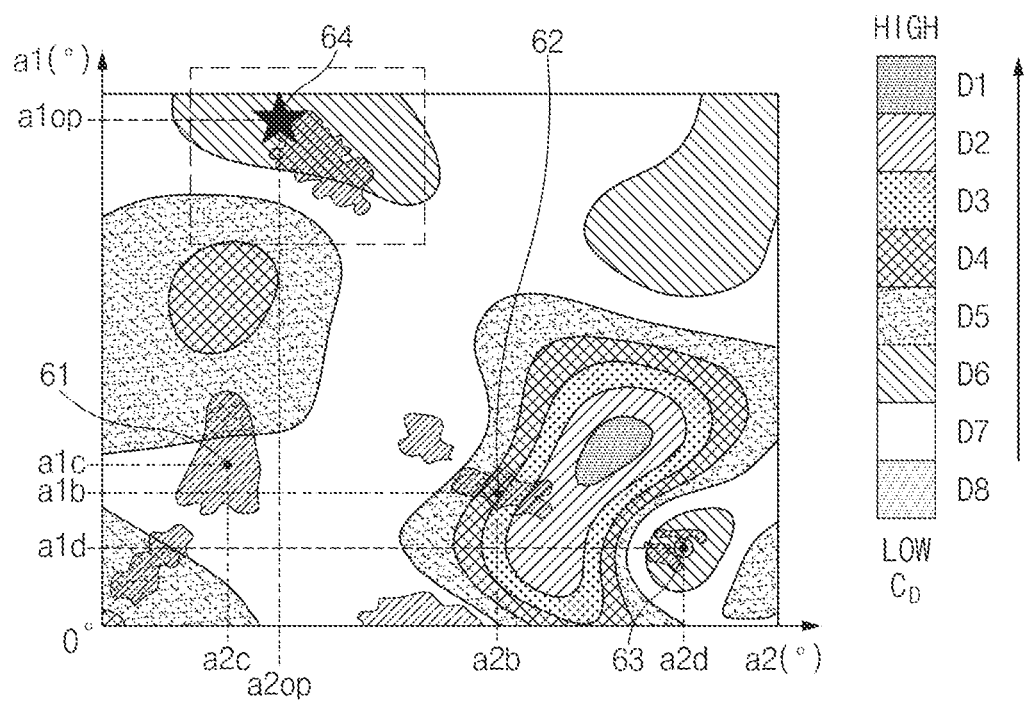
FIG. 14 illustrates a graph of various position modes indicated on the response surface of the drag coefficient illustrated in FIG. 13.

FIG. 14 illustrates a graph of the cooling optimum position mode 61, the brake cooling optimum position mode 62, the aerodynamic optimum position mode 63, and the multi-objective optimum position mode 64 indicated on the response surface of the drag coefficient illustrated in FIG. 13. In the multi-objective optimum position mode 64, all of the cooling performance, the braking performance, and the aerodynamic performance may simultaneously be satisfied. In the multi-objective optimum position mode 64, the first vane 21 may be in a first simultaneous optimal position a1op, and the second vane 31 may be in a second simultaneous optimal position a2op. For example, a tilting angle of the first vane 21 in the first simultaneous optimal position a1op may be greater than that of the second vane 31 in the second simultaneous optimal position a2op. Accordingly, the air exiting from the air outlet 13 may be guided toward a lower portion of the front wheel 1 by the first vane 21 and simultaneously be guided toward the outside of the front wheel 1 by the second vane 31.

Referring to FIGS. 11 to 14, the tilting angle of the first vane 21 in the first cooling position a1c may be greater than that of the first vane 21 in the first brake position a1b, and the tilting angle of the first vane 21 in the first brake position a1b may be greater than that of the first vane 21 in the first aerodynamic position a1d. Accordingly, when the first vane 21 is in the first aerodynamic position a1d, the air exiting from the air outlet 13 may be guided toward the upper portion of the front wheel 1. When the first vane 21 is in the first brake position a1b, the air exiting from the air outlet 13 may be directly guided toward the brake mechanism 2. When the first vane 21 is in the first cooling position a1c, the air exiting from the air outlet 13 may be guided toward the lower portion of the front wheel 1. The tilting angle of the first vane 21 in the first simultaneous optimal position a1op may be greater than that of the first vane 21 in the first cooling position a1c. When the first vane 21 is in the first simultaneous optimal position a1op, the air exiting from the air outlet 13 may be guided toward the lowermost portion of the front wheel 1.

Referring to FIGS. 11 to 14, the tilting angle of the second vane 31 in the second aerodynamic position a2d may be greater than that of the second vane 31 in the second brake position a2b, and the tilting angle of the second vane 31 in the second brake position a2b may be greater than that of the second vane 31 in the second cooling position a2c. Accordingly, when the second vane 31 is in the second aerodynamic position a2d, the air exiting from the air outlet 13 may be guided toward the outside of the vehicle. When the second vane 31 is in the second brake position a2b, the air exiting from the air outlet 13 may be directly guided toward the brake mechanism 2. When the second vane 31 is in the second cooling position a2c, the air exiting from the air outlet 13 may be guided toward the front wheel 1 and the inside of the front wheel housing 11 (the inside of the vehicle). The tilting angle of the second vane 31 in the second simultaneous optimal position a2op may be less than that of the second vane 31 in the second brake position a2b and be greater than that of the second vane 31 in the second cooling position a2c. When the second vane 31 is in the second simultaneous optimal position a2op, the air exiting from the air outlet 13 may be guided toward the front wheel 1 and the inside of the front wheel housing 11 (the inside of the vehicle).

As set forth above, according to exemplary embodiments of the present disclosure, the plurality of first vanes and the plurality of second vanes may be tiltable in a position adjacent to the air outlet of the front wheel house so that the direction of air flow exiting from the air outlet of the front wheel house may be adjusted step by step. Thus, the direction of air flow from the air outlet of the front wheel house may be appropriately adjusted to be suitable for various drive modes (driving conditions). That is, the aerodynamic performance, the cooling performance of the heat exchanger, and the cooling performance of the brake mechanism may be optimally improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. An air guide apparatus for a vehicle, the air guide apparatus comprising:
   a front wheel housing at least partially surrounding a front wheel, the front wheel housing having an air outlet open to the front wheel;
   a first vane assembly including a plurality of first vanes which are tiltable in a position adjacent to the air outlet, and a first driving mechanism by which the plurality of first vanes are driven; and
   a second vane assembly including a plurality of second vanes which are tiltable in a position adjacent to the plurality of first vanes, and a second driving mechanism by which the plurality of second vanes are driven.

2. The air guide apparatus according to claim 1, wherein the plurality of first vanes are located in front of the air outlet of the front wheel housing, and the plurality of second vanes are located in front of the plurality of first vanes.

3. The air guide apparatus according to claim 1, wherein each of the plurality of first vanes includes a first shaft, and wherein an axis of the first shaft is aligned with a central longitudinal axis of the first vane.

4. The air guide apparatus according to claim 3, wherein the central longitudinal axis of the first vane and the axis of the first shaft extend in a width direction of the vehicle.

5. The air guide apparatus according to claim 3, wherein the first driving mechanism includes a first actuator, and a first power transmission transmitting power of the first actuator to the plurality of first shafts.

6. The air guide apparatus according to claim 5, wherein the first power transmission includes a first drive member moving linearly by the first actuator, and a plurality of first driven members rotated by the first drive member, and each of the plurality of first driven members are fixed to one of the plurality of first shafts.

7. The air guide apparatus according to claim 6, wherein the first actuator is a linear actuator causing the first drive member to move linearly, the first drive member is a rack gear having a plurality of rack teeth spaced apart from each other at a predetermined linear pitch, and each first driven member is a pinion gear having a plurality of teeth spaced apart from each other at a predetermined circular pitch.

8. The air guide apparatus according to claim 5, wherein the first power transmission includes a first drive pulley connected to the first actuator, a plurality of first driven pulleys each fixed to one of the plurality of first shafts, and a first belt wound between the first drive pulley and the plurality of first driven pulleys.

9. The air guide apparatus according to claim 8, wherein the first actuator is a drive motor causing the first drive pulley to rotate,
   the first drive pulley is a toothed pulley having a plurality of teeth spaced apart from each other at a predetermined circular pitch on an inner circumferential surface,
   each first driven pulley is a toothed pulley having a plurality of teeth spaced apart from each other at a predetermined circular pitch on an outer circumferential surface, and
   the first belt is a timing belt having a plurality of teeth meshing with the teeth of the first drive pulley and the teeth of the first driven pulley.

10. The air guide apparatus according to claim 1, wherein each of the plurality of second vanes includes a second shaft, and wherein an axis of the second shaft is aligned with a central longitudinal axis of the second vane.

11. The air guide apparatus according to claim 10, wherein the central longitudinal axis of the second vane and the axis of the second shaft extend in a height direction of the vehicle.

12. The air guide apparatus according to claim 10, wherein the second driving mechanism includes a second actuator, and a second power transmission transmitting power of the second actuator to the plurality of second shafts.

13. The air guide apparatus according to claim 12, wherein the second power transmission includes a second drive member moving linearly by the second actuator, and a plurality of second driven members rotated by the second drive member, and each of the plurality of second driven members are fixed to one of the plurality of second shafts.

14. The air guide apparatus according to claim 13, wherein the second actuator is a linear actuator causing the second drive member to move linearly,
   the second drive member is a rack gear having a plurality of rack teeth spaced apart from each other at a predetermined linear pitch, and
   each second driven member is a pinion gear having a plurality of teeth spaced apart from each other at a predetermined circular pitch.

15. The air guide apparatus according to claim 12, wherein the second power transmission includes a second drive pulley connected to the second actuator, a plurality of second driven pulleys each fixed to one of the plurality of second shafts, and a second belt wound between the second drive pulley and the plurality of second driven pulleys.

16. The air guide apparatus according to claim 15, wherein the second actuator is a drive motor causing the second drive pulley to rotate, the second drive pulley is a toothed pulley having a plurality of teeth spaced apart from each other at a predetermined circular pitch on an inner circumferential surface, each second driven pulley is a toothed pulley having a plurality of teeth spaced apart from each other at a predetermined circular pitch on an outer circumferential surface, and the second belt is a timing belt having a plurality of teeth meshing with the teeth of the second drive pulley and the teeth of the second driven pulley.

17. The air guide apparatus according to claim 1, wherein a central longitudinal axis of the second vane is perpendicular to a central longitudinal axis of the first vane.

18. The air guide apparatus according to claim 1, further comprising a controller controlling the first driving mechanism and the second driving mechanism, wherein the controller controls the first driving mechanism and the second driving mechanism to adjust a tilting position of the first vane and a tilting position of the second vane to position modes predetermined according to drive modes of the vehicle selected by a driver.

19. The air guide apparatus according to claim 18, wherein the position modes include a cooling optimum position mode, a brake cooling optimum position mode, an aerodynamic optimum position mode, and a multi-objective optimum position mode, in the cooling optimum position mode, the first vane is in a first cooling position, and the second vane is in a second cooling position, in the brake cooling optimum position mode, the first vane is in a first brake position, and the second vane is in a second brake position, in the aerodynamic optimum position mode, the first vane is in a first aerodynamic position, and the second vane is in a second aerodynamic position, in the multi-objective optimum position mode, the first vane is in a first simultaneous optimal position, and the second vane is in a second simultaneous optimal position, a tilting angle of the first vane in the first cooling position is greater than that of the first vane in the first brake position, a tilting angle of the first vane in the first brake position is greater than that of the first vane in the first aerodynamic position, a tilting angle of the first vane in the first simultaneous optimal position is greater than that of the first vane in the first cooling position, a tilting angle of the second vane in the second aerodynamic position is greater than that of the second vane in the second brake position, a tilting angle of the second vane in the second brake position is greater than that of the second vane in the second cooling position, and a tilting angle of the second vane in the second simultaneous optimal position is less than that of the second vane in the second brake position and is greater than that of the second vane in the second cooling position.

\* \* \* \* \*